Sept. 11, 1951  J. GOGAN  2,567,333
THICKNESS TESTING MACHINE
Filed Jan. 29, 1945  3 Sheets-Sheet 3

INVENTOR.
JOSEPH GOGAN
BY
Kwis Hudson Boughton & Williams
ATTORNEYS

Patented Sept. 11, 1951

2,567,333

UNITED STATES PATENT OFFICE 2,567,333

THICKNESS TESTING MACHINE

Joseph Gogan, Lakewood, Ohio

Application January 29, 1945, Serial No. 575,018

18 Claims. (Cl. 33—169)

This invention relates to testing apparatus, and more particularly, aims to provide testing apparatus of an improved construction which is well suited for rapidly and accurately testing individual specimens such as metal bodies or parts having a substantially dielectric coating or surface thereon.

Another object of this invention is to provide improved testing apparatus of this character embodying a penetrator adapted to be moved into the dielectric coating or surface and a depth gauge for measuring the thickness of such coating or surface, and wherein the actuation of the gauge is controlled by means which includes a micro-ampere circuit established through the penetrator and specimen.

A further object of the present invention is to provide an improved testing apparatus of this character having a penetrator or test member engageable with a specimen and in which the test load is applied by a movable member having a body of liquid shiftable therein.

Still another object of the invention is to provide an improved testing apparatus of the character mentioned in which the shifting of the liquid is retarded to cause a gradual application of the test load and has a relatively free return flow when the load is being removed.

The invention can be further briefly summarized as consisting in certain novel combinations and arrangements of parts herein described and particularly set out in the appended claims.

In the accompanying sheets of drawings:

Fig. 3 is a partial vertical sectional view on a larger scale and taken on line 3—3 of Fig. 2;

Figure 1:
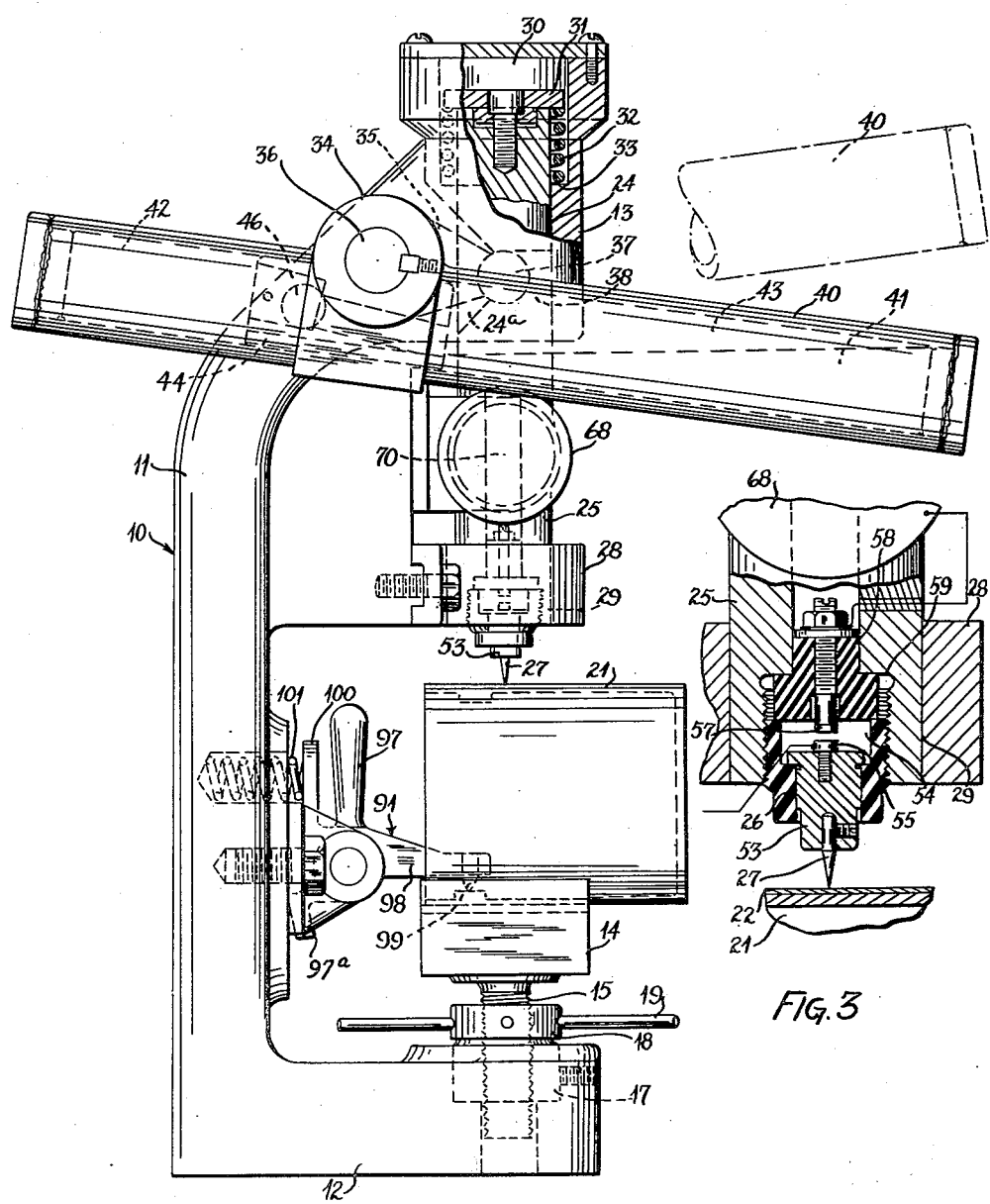
Fig. 1 is a side elevational view, with portions broken away, showing a testing machine embodying the present invention.

The present invention provides an improved testing machine which is especially suitable for rapidly and accurately measuring the thickness of dielectric coatings or surfaces of individual metal bodies. Such a dielectric coating or surface is now frequently provided on the metal parts of engines and other machines as a means for protecting the parts from corrosion and deterioration. This protective means can be in the form of paint, lacquer or other suitable composition applied to the metal body and which coating is substantially nonconducting or dielectric in character, or may be a so-called "anodized" surface or the like provided on the metal body and which is likewise substantially nonconducting or dielectric in character. It is desirable to be able to rapidly and accurately test or measure the thickness of this protective coating or surface on the individual metal bodies or parts, and so far as I am aware, no satisfactory way has heretofore been available for doing this.

In the embodiment of the invention illustrated in the drawings, I show a testing machine 10 having an upright frame 11 provided with a base 12 adapted to rest or stand on a suitable support and a head 13 spaced above such base. The base 12 is provided with an anvil or work support 14 having a threaded stem or screw 15 for adjusting the height thereof. The anvil 14 is of an appropriate shape to suit the body or article to be supported thereon, and in this instance, the anvil has a substantially V-shaped recess 16 therein. The screw 15 of the anvil is guided in a bushing 17 which is recessed into the base 12 and has threaded engagement with a nut or collar 18 located above such bushing and which is rotatable for raising or lowering the anvil. The nut 18 can be provided with bars or handles 19 to facilitate the turning or adjustment thereof.

Figures 2, 5:
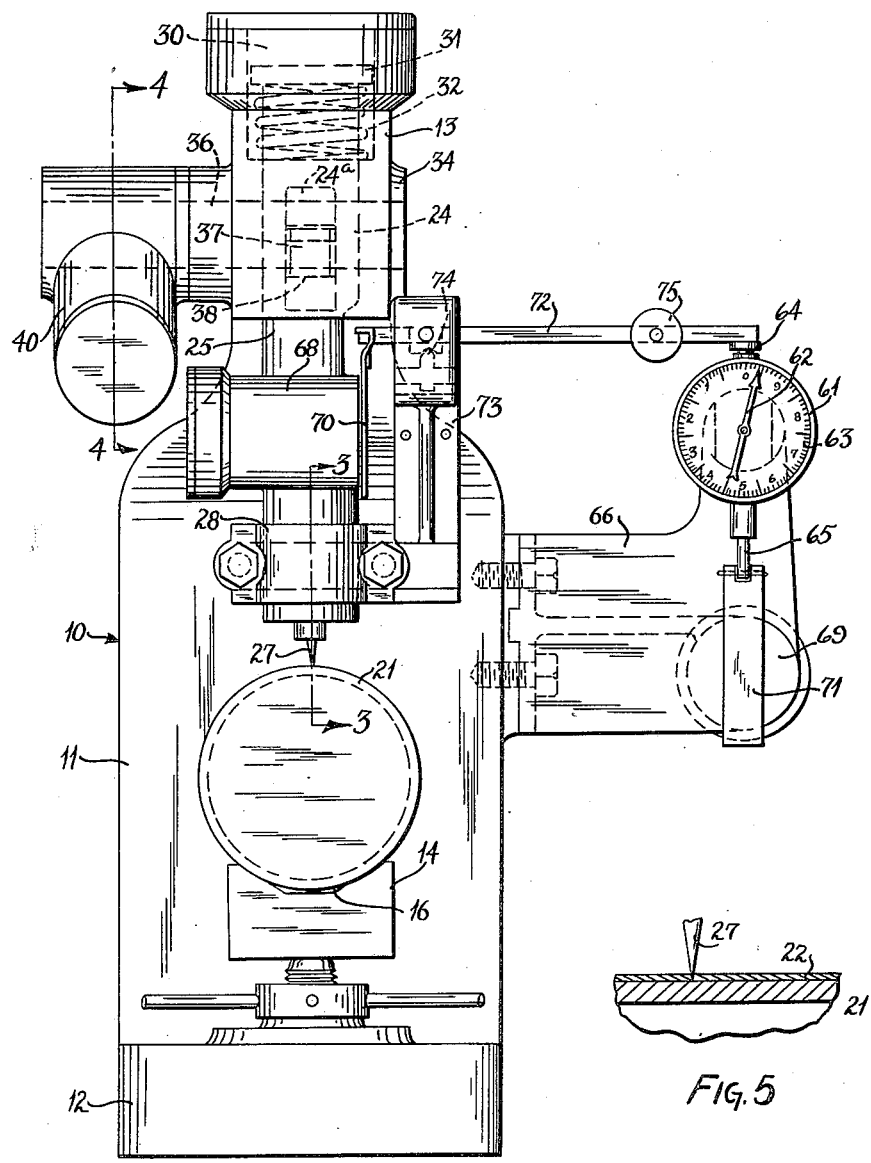
Fig. 2 is a front elevation of the machine.
Fig. 5 is a detail sectional view showing the penetrator as having been moved into the dielectric coating or surface of the specimen.
Figure 4:
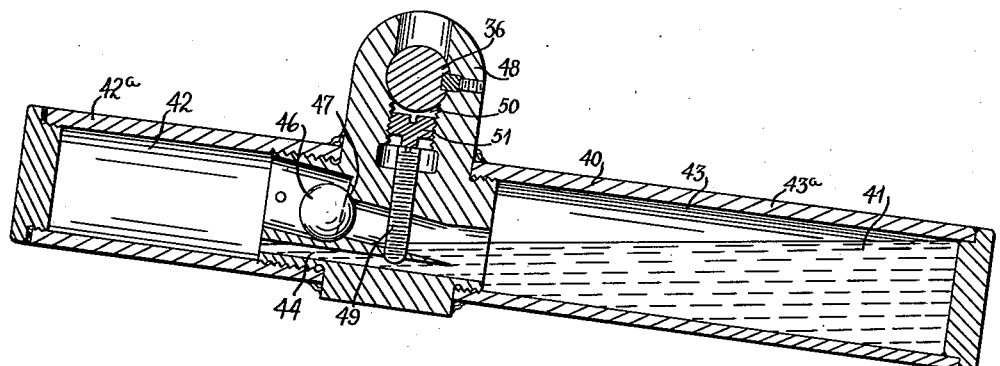
Fig. 4 is a sectional view taken through the liquid-containing member of the load applying means, as indicated by line 4—4 of Fig. 2.

As indicated above, the improved testing apparatus can be used with various metal bodies or parts to be tested. In this instance, I show the specimen 21 to be tested as being in the form of a hollow sleeve or body, such as an engine piston, which seats in the V-shaped recess 16 of the anvil 14. As shown in Figs. 3 and 5, the specimen 21 has an external dielectric coating or surface 22 thereon whose thickness is to be measured or checked. The thickness of the coating or surface 22 may vary with the different types of metal bodies or specimens and may be on the order of a few thousandths of an inch in thickness. It will accordingly be seen that the testing machine must have a high degree of accuracy in order to satisfactorily measure small variations occurring in a dielectric coating or surface of this character.

The head 13 of the frame 11 has a guide way 24 therein which extends in substantially vertical relation and whose axis is aligned substantially with the axis of the screw 15 of the anvil. A spindle 25 is slidably movable in the guide way 24 and extends for some distance below the lower end of the head 13. The spindle 25 is provided at its lower end with a holder or bushing 26 which is screwed into the spindle and in which a test member or penetrator 27 is movably mounted for engagement with the specimen 21. At a point below the head 13 and spaced therefrom, the frame 11 is provided with a guide member or bracket 28 having an opening 29 in which the lower end of the spindle 25 is slidably guided. The upper end of the spindle extends into an enlargement 30 of the guide way 24 and carries a shoulder or collar 31. A compression spring 32 interposed between the shoulder 31 and a spring seat 33 provided on the head 13 acts on the spindle to lift or urge the same in a direction away from the specimen 21.

For moving the spindle 25 toward the specimen 21, the machine is provided with an actuating lever 35 which is keyed to an intermediate portion of a rock shaft 36 which extends adjacent the guide way 24 and is journaled in spaced bearings 34 of the frame 11. The inner end of the lever 35 extends into the guide way through an opening 24a and has a rounded boss or head 37 thereon which is rockable and slidable in an opening or recess 38 of the spindle 25 so as to provide an operating connection between the lever and spindle.

The test load is applied to the spindle through the lever 35 by imparting rocking movement to the shaft 36. For improving the accuracy of the apparatus it is desirable to apply the test load gradually, and to permit this to be done, I provide an elongated hollow actuating member 40 on the rock shaft 36 and which contains a shiftable body 41 of liquid such as mercury or any other appropriate liquid or composition. The hollow member 40 has two chambers, 42 and 43, therein which are connected by a relatively restricted passage 44 and by a second relatively larger passage 45 which is controlled by a check valve, preferably in the form of the ball 46, which is adapted to engage a valve seat 47 for closing this passage. The passages 44 and 45 are located in the hollow member 40 at a point adjacent the rock shaft 36, and in this instance, they are contained in a block or intermediate part 48 which is keyed to the shaft 36. The liquid chambers 42 and 43, which can be referred to as reservoir and working chambers respectively, are formed by tubular sections 42a and 43a which are screwed onto threaded portions of the block 48. The tubular section 43a is somewhat longer than the section 42a and is of a length to provide the necessary leverage to enable the weight of the liquid 41 to apply a predetermined test load to the penetrator 27 when the liquid is transferred to the chamber 43.

The passage 44, being a relatively restricted passage, retards the flow of liquid from the reservoir chamber 42 to the working chamber 43 so that the application of the test load to the spindle 25 by the shifting of the liquid into the latter chamber will take place in a gradual manner. The size or effective cross-sectional area of the passage 44 can be adjusted to vary the rate of application of the test load, as by means of an adjusting screw 49 located in the block 48 and whose lower end extends into the passage 44. To discourage unauthorized adjustment or tampering with the screw 49, this member is preferably concealed by locating the same in a recess 50 which is normally closed by the shaft 36 and by a removable screw plug 51.

The larger passage 45 provides for a relatively rapid return flow of the liquid 41 from the chamber 43 back to the reservoir chamber 42 when the hollow member 40 is returned to its elevated or initial position shown in broken lines in Fig. 1 upon the completion of a test. When the hollow member is in its elevated position, the ball 46 shifts away from the seat 47 by gravity so that a free return flow of the liquid through the passage 45 can take place. When the hollow member 40 is swung downwardly to its load applying position, the ball 46 engages the seat 47, thereby closing the passage 45 and leaving only the passage 44 for the above mentioned restricted transfer of liquid from the reservoir chamber 42 to the working chamber 43.

The test member or penetrator 27 is in the form of a relatively sharply pointed element or pin mounted in a plunger 53 which is made of electrically conducting material and is slidably retained in the bushing 26. The upper end of the plunger 53 extends into a chamber 54 and carries an electric contact 55, the latter being electrically connected with the penetrator 27 through the body of the plunger. The bushing 26 is made of insulating material so that the plunger 53 will be insulated from the other portions of the machine. A second electric contact 57 is located in the chamber 54 above the contact 55 and is carried by a shouldered block 58 of insulating material which is clamped against the shoulder 59 of the spindle 25 by the upper end of the bushing 26.

For measuring the penetration of the dielectric coating or surface 22 of the specimen 21, the machine is provided with a sensitive depth gauge 61 having a movable pointer 62 which cooperates with a graduated scale 63. The gauge 61 is of a conventional construction and has external movable head and stem elements 64 and 65 located respectively at the top and bottom thereof. This gauge is of the type embodying a spring in the internal mechanism thereof which tends to move or advance the pointer 62 away from its zero position whenever downward pressure on the head 64 is decreased or removed. The gauge 61 is suitably mounted on the frame 11 of the machine as by means of a bracket 66 extending laterally therefrom.

The actuation of the gauge 61 is controlled by electrical means which includes the above mentioned electric contacts 55 and 57 and by a pair of movable and stationary electromagnets 68 and 69. The movable magnet 68 is carried by the spindle 25 and is located on the exposed portion thereof which extends between the head 13 and the guide bracket 28. The stationary electromagnet 69 is carried by the bracket 66 and is located directly below the gauge 61. The actuating means for the gauge 61 includes armatures 70 and 71 of strip-like form which are located adjacent the respective magnets 68 and 69 and extend across the ends or cores of these magnets. The gauge actuating mechanism also includes a lever 72 which is rockably supported in an upward extension 73 of the bracket 28 by means of a knife-edged fulcrum 74.

The outer end of the lever 72 engages and rests upon the head 64 of the gauge 61 so that when this outer end is swung upwardly it will decrease or remove the pressure on the head 64 and thereby result in actuation of the gauge so that a reading or indication will be given by its scale 63 and cooperating pointer 62. The armature 70 of the movable magnet 68 is attached to the inner end of the lever 72 so that when this magnet is energized the inner end of the lever will be connected to the spindle 25 for movement therewith, and when the spindle is shifted downwardly during a test, the outer end of the lever 72 will be swung upwardly to cause actuation of the gauge 61 as explained above. When the magnet 68 is deenergized, the armature 70 is released, thereby disconnecting the lever 72 from the spindle 25. An adjusting or calibrating weight 75 of appropriate mass is provided on the lever 72 and is adjustably movable therealong.

The purpose of the magnet 69 is to arrest or discontinue the actuation of the gauge 61 at the instant that the penetrator 27 moves through the dielectric coating or surface 22 and engages the underlying electrically conducting metallic portion of the specimen 21. When the penetrator moves through the coating or surface 22 and engages the underlying metallic portion of the specimen 21, an electric circuit is completed, as will be presently explained, resulting in the magnet 69 being energized to attract the armature 71. This armature is carried by the movable pin 65 of the gauge 61, and when this armature is attracted and held by the magnet 69, further actuation of the gauge 61 will be prevented even though some further movement of the penetrator 27 takes place. So long as the magnet 69 remains energized, the gauge 61 will be locked against movement of its pointer in either direction thus affording the operator of the machine ample time to obtain an accurate reading from the gauge. When the magnet 69 is deenergized, the gauge pointer 62 is returned to its zero position.

In carrying out the above described test operation, it is desirable that the penetrator 27 have a relatively sharp point. I have also found it desirable to control the test operation by the use of a control circuit which extends through the penetrator and specimen. To successfully carry out the test operation by the use of such a control circuit extending through the sharply pointed penetrator and specimen, I have found it necessary to use an electric current of a microamperage characteristic and preferably also of low voltage in order to prevent burning of the sharp point of the penetrator.

Figure 6:
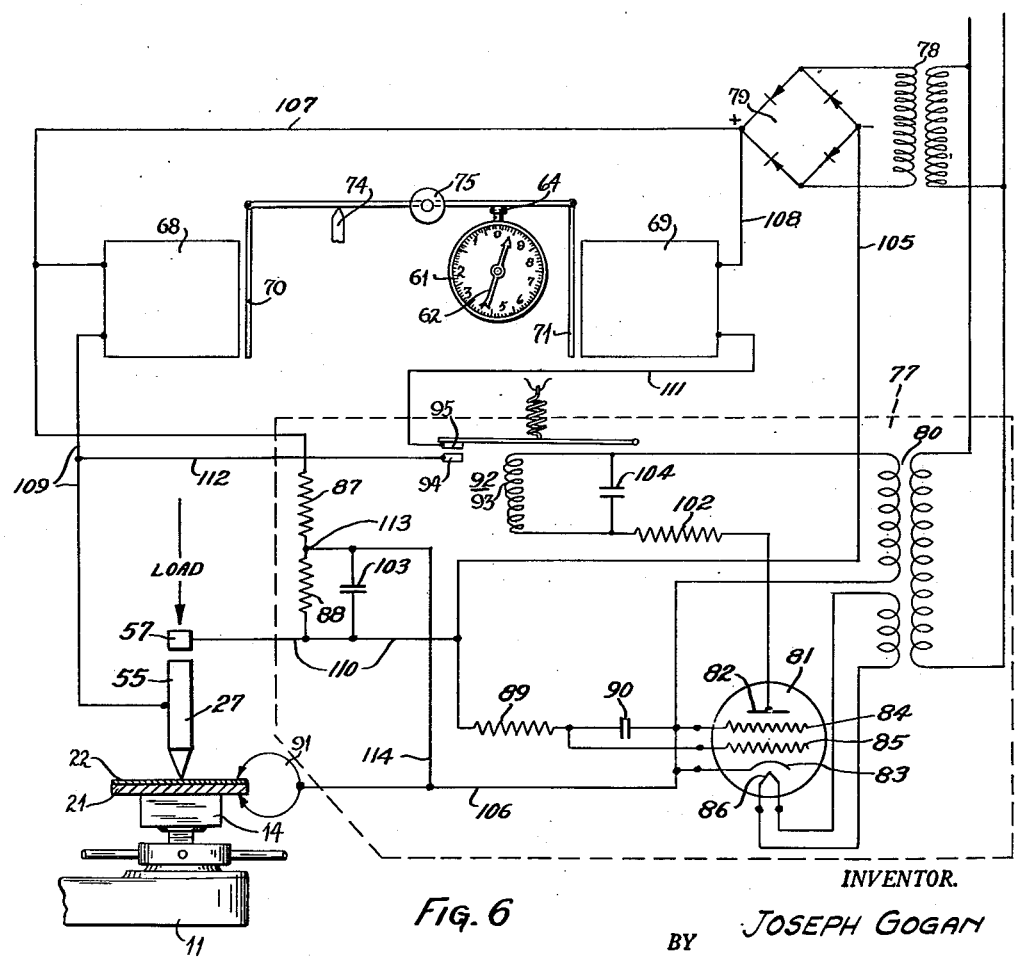
Fig. 6 is a wiring diagram illustrating the electric circuits employed.

In Fig. 6 of the drawings, I have shown a wiring diagram which illustrates one suitable arrangement for the energizing circuits for the electromagnets 68 and 69, and for the control circuit which extends through the penetrator 27 and the specimen 21. The electrical apparatus shown in Fig. 6 includes the above mentioned contacts 55 and 57 and also includes a current sensitive relay unit 77 which is responsive to the microamperage current of the control circuit extending through the penetrator and specimen. The energizing current for the electromagnets 68 and 69 may be on the order of a six-volt direct current obtained from a suitable transformer 78 and rectifier 79. The current which is utilized in the control circuit is obtained from a suitable transformer 80 which is embodied in the unit 77.

In addition to the transformer 80 the unit 77 also includes an electron tube 81 and a magnetic relay 92. The electron tube may be of the type containing a plate 82, a cathode 83, a plurality of grids 84 and 85 and a heater 86 for the cathode. The control circuit also includes suitable resistors 87, 88, 89 and 102, suitable condensers 90, 103 and 104, and a detachable terminal or clamp 91 which can be conveniently applied to the specimen 21. The electromagnet 69 is not energized by the current of micro-amperage but is merely controlled by this current acting through the electron tube 81 and the magnetic relay 92. This magnetic relay has an energizing coil 93 connected with the plate 82 of the electron tube 81 and also has control contacts 94 and 95 located in the energizing circuit of the magnet 69.

The terminal connection or clamp 91 can be embodied in the machine 10 in the form of a lever 97 which is pivoted on the frame 11 and has an angularly extending finger 98 adapted to extend inside the hollow specimen 21 and having a pointed contact 99 thereon for engaging and making a good electrical connection with the metallic portion of the specimen. A second arm 100 carried by the lever 97 is disposed adjacent the frame 11 and is acted upon by the compression spring 101 for urging the point 99 against the specimen 21. When the specimen is to be placed on the anvil 14, the lever 97 is swung toward the left as seen in Figure 1, thereby lifting the point 99 and compressing the spring 101. When the specimen has been moved into place, the lever 97 is released whereupon the point 99 is pressed against the specimen by the action of the spring 101. The lever 97 also carries a stop 97a which is engageable with the frame 11 for holding the point 99 in spaced relation to the anvil 14 when the specimen has been removed.

To summarize the operation of the above described testing apparatus, let it be assumed that the specimen 21 having a dielectric coating or surface 22 thereon has been placed on the anvil 14, and the terminal member 91 of the microamperage control circuit has been applied to the specimen in the manner just described above. Let it also be assumed that at the time the specimen 21 is placed on the anvil 14 the spindle 25 is in its elevated position corresponding with the broken line position of the hollow member 40 as shown in Fig. 1. By adjusting the nut 18, the anvil 14 is raised with the specimen 21 thereon to bring the latter into a light engagement with the penetrator 27. The operator then tilts the hollow actuating member 40 downwardly toward its full line position shown in Fig. 1 which causes a corresponding downward movement of the spindle 25. The initial downward movement of the spindle 25 causes the contact 57 to engage the contact 55, the latter being supported lightly on the specimen 21 by the penetrator 27, thereby closing the energizing circuit for the electromagnet 68. The energization of this magnet connects the gauge 61 for actuation in response to any succeeding movement of the spindle 25 as previously explained above. The closing of the contacts 55 and 57 could be produced instead, by the raising of the specimen 21 by means of the anvil 14 as explained above.

The tilting of the hollow actuating member 40 toward its lower position also causes the body of liquid 41 to flow from the chamber 42 into the chamber 43. This retarded transfer of the liquid into the chamber 43 causes the test load to be applied gradually to the penetrator 27 through the closed electric contacts 57 and 55. The application of this test load causes the penetrator 27 to move into and through the dielectric coating or surface 22, and this movement of the penetrator is accompanied by a corresponding indicating movement of the gauge 61. When the penetrator 27 has passed through the coating or surface 22 and engages the underlying metallic portion of the specimen 21, the micro-amperage control circuit acting through the electron tube 81 and the electromagnetic relay 92, causes the magnet 69 to be energized for instantly locking the gauge 61 against further movement. The operator thereupon notes the reading of the gauge 61 and then removes the specimen 21 from the machine. In connection with the wiring diagram of Fig. 6, it can be pointed out further that the electron tube 81 is of the type in which the grid 84 is an amplifying screen grid and the grid 85 is a control grid. The electron tube 81 is connected with the negative direct current terminal of the rectifier 79 by the conductor 105 and is also connected with the clamp 91 by the conductor 106. The magnets 68 and 69 are connected with the positive direct current terminal of the rectifier by the conductors 107 and 108 respectively. The return circuit from the magnet 68 to the negative side of the rectifier is established through conductor 109, closed contacts 55 and 57, conductor 110 and conductor 105. The return circuit for the magnet 69 is established through conductor 111, closed relay contacts 94 and 95, and conductor 112 to conductor 109 and then as traced above for magnet 68. The resistors 87 and 88 constitute a voltage divider connected across the direct current terminals of the rectifier and the intermediate point 113 of which is connected with the cathode 83 through the conductor 114 and a portion of the conductor 106.

Prior to the complete penetration of the dielectric coating 22 by the penetrator 27 a negative potential is supplied to the control grid 85 from the rectifier 79 through conductor 105 and resistor 89 and causes this grid to block the flow of electrons from the cathode 83 to the plate 82 and, hence at this time, little or no current flows through the winding 93 of the relay 92. When the point of the penetrator passes through the coating 22 of the specimen the clamp 91 becomes electrically connected with the penetrator through the specimen and the circuit then established for the electron tube causes the control grid 85 to become less negative to the extent that electrons flow to the plate 82 and cause energizing current to be supplied to the winding 93 of the relay 92 for closing the relay contacts 94 and 95 to accomplish the purpose above explained.

From the foregoing description and the accompanying drawings, it will now be readily understood that the present invention provides improved testing apparatus with which individual bodies or metal parts can be rapidly and accurately tested for measuring the thickness of a dielectric coating or surface thereon. It will also be seen that by the use of a current sensitive relay and a control circuit using a current of micro-amperage characteristic, the relatively sharp point of the penetrator is protected against burning so that accurate and reliable tests can be made over a prolonged period of time. It will be seen, furthermore, that the present invention also provides an improved testing machine in which a gradual application of the test load can be obtained by the use of a movable actuating member having a shiftable body of liquid therein.

While I have illustrated and described the improved testing apparatus of the present invention in considerable detail, it will be understood of course that I do not wish to be correspondingly limited, but regard my invention as including all changes and modifications coming within the spirit of the invention and the scope of the appended claims.

Having thus described my invention, I claim:

1. Apparatus for measuring the thickness of a dielectric coating or surface of a metallic body, comprising a work support adapted to receive said body thereon, a penetrator, means for applying a load so as to cause the penetrator to enter said dielectric surface comprising a tiltable hollow member having a body of liquid shiftable therein, a depth gauge having a movable indicator, means for actuating said gauge in response to movement of the penetrator into said dielectric surface, and electromagnetic means operable when energized to stop the actuation of said gauge and including an electric circuit adapted to be completed through said body and penetrator.

2. Apparatus for measuring the thickness of a dielectric coating or surface of a metallic body, comprising a work support adapted to receive said body thereon, a penetrator having a relatively sharp point, means including a body of liquid shiftable by gravity for applying a load so as to cause the penetrator to enter said dielectric surface, a depth gauge having a movable indicator, means for actuating said gauge in response to movement of the penetrator into said dielectric surface, an electromagnet adapted when energized to stop the actuation of said gauge, means for energizing said electromagnet in response to the complete penetration of said dielectric surface by said penetrator including a control circuit having circuit connections for the completion of said circuit through said body and penetrator, and means for supplying electric current of micro-ampere value to said control circuit.

3. Apparatus for measuring the thickness of a dielectric coating or surface of a metallic body, comprising a work support adapted to receive said body thereon, a penetrator having a relatively sharp point, means including a body of liquid shiftable by gravity for applying a load so as to cause the penetrator to enter said dielectric surface, a depth gauge having a movable indicator, means for actuating said gauge in response to movement of the penetrator into said dielectric surface, an electromagnet adapted when energized to stop the actuation of said gauge, an energizing circuit for said electromagnet, a control circuit having circuit connections for the completion of the control circuit through said body and penetrator in response to the complete penetration of said dielectric surface by said penetrator, relay means responsive to said control circuit and controlling the energizing circuit of said electromagnet, and means for supplying electric current of micro-ampere value to said control circuit.

4. Apparatus for measuring the thickness of a dielectric coating or surface of a metallic body, comprising a work support adapted to receive said body thereon, a penetrator, means for causing an initial relative movement between said work support and penetrator for engaging the latter with said dielectric surface, a depth gauge having a movable pointer, means including a body of liquid shiftable by gravity for applying a load so as to cause a subsequent relative movement between said work support and penetrator for moving the latter into said dielectric surface, and means for rendering said gauge responsive to said subsequent relative movement including an electromagnet having an energizing circuit containing switch contacts adapted to be closed during engagement of the penetrator with the top of said dielectric surface.

5. Apparatus for measuring the thickness of a dielectric coating or surface of a metallic body, comprising a work support adapted to receive said body thereon, a penetrator, means for causing an initial relative movement between said work support and penetrator for engaging the latter with said dielectric surface, a depth gauge having a movable pointer, means including a body of liquid shiftable by gravity for applying a load so as to cause a subsequent relative movement between said work support and penetrator for moving the latter into said dielectric surface, means for rendering said gauge responsive to said subsequent relative movement including an electromagnet adapted to be energized during engagement of the penetrator with the top of said dielectric surface, a second electromagnet adapted when energized to stop the actuation of said gauge, and energizing means for the second electromagnet including an electric circuit adapted to be completed through said body and penetrator.

6. Apparatus for measuring the thickness of a dielectric coating or surface of a metallic body, comprising a work support adapted to receive said body thereon, a penetrator having a relatively sharp point, means for causing an initial relative movement between said work support and penetrator for engaging the latter with said dielectric surface, a depth gauge having a movable pointer, means including a body of liquid shiftable by gravity for applying a load so as to cause a subsequent relative movement between said work support and penetrator for moving the latter into said dielectric surface, means for rendering said gauge responsive to said subsequent relative movement including an electromagnet having an energizing circuit containing switch contacts adapted to be closed during engagement of the penetrator with the top of said dielectric surface, a second electromagnet adapted when energized to stop the actuation of said gauge, means for energizing said second electromagnet in response to the complete penetration of said dielectric surface by said penetrator including a control circuit having circuit connections for the completion of the control circuit through said body and penetrator, and means for supplying electric current of micro-ampere value to said control circuit.

7. A machine of the character described, comprising a frame, a work support on said frame adapted to receive thereon a metallic body having a dielectric coating or surface, a spindle movable on said frame toward and away from said work support, a penetrator carried by said spindle for engagement with said body and having limited movement relative to the spindle, said work support being movable for lifting said body to engage said penetrator and cause said limited relative movement of the latter, a pair of switch contacts adapted to be closed by said limited relative movement, means including a body of liquid shiftable by gravity for applying a load to said spindle for causing said penetrator to enter said dielectric surface, a gauge having a movable indicator, means including an electromagnet for rendering said gauge responsive to movement of the penetrator into said surface, an energizing circuit for the electromagnet controlled by said switch contacts, a second electromagnet for stopping the actuation of said gauge, and a control circuit for said second electromagnet adapted to be completed through said body and penetrator.

8. In a machine of the character described, a frame having thereon a work supporting member and a test member, said work supporting member and said test member being relatively movable for engaging the latter with a specimen, and means for applying a load to one of said members comprising a movable hollow element having a body of liquid shiftable therein.

9. In a machine of the character described, a frame having thereon a work supporting member and a test member, said work supporting member and said test member being relatively movable for engaging the latter with a specimen, means for applying a load to one of said members comprising a movable hollow element having a body of liquid shiftable therein, and means mounting said element for tilting movement for causing such shifting of the body of liquid therein.

10. In a machine of the character described, a frame having thereon a work supporting member and a test member, said work supporting member and said test member being relatively movable for engaging the latter with a specimen, and means for applying a load to one of said members comprising a movable hollow element having a body of liquid shiftable therein, said hollow element having means for retarding the shifting of the liquid therein for causing a gradual application of the load.

11. In a machine of the character described, a frame having thereon a work supporting member and a test member, said work supporting member and said test member being relatively movable for engaging the latter with a specimen, and means for applying a load to one of said members comprising a movable hollow element having a body of liquid shiftable therein, said hollow element being provided with flow control means for retarding the shifting of the liquid in one direction for causing a gradual application of the load and permitting a relatively rapid shifting of the liquid in the opposite direction when the load is to be removed.

12. In a machine of the character described, a frame having thereon a work supporting member and a test member, said work supporting member and said test member being relatively movable for engaging the latter with a specimen, and means for applying a load to one of said members comprising a tiltable hollow element having a body of mercury shiftable therein.

13. In a machine of the character described, a frame having thereon a work supporting member and a test member, said work supporting member and said test member being relatively movable for engaging the latter with a specimen, and means for applying a load to one of said members comprising a tiltable hollow element having a body of liquid shiftable therein, said hollow element having a relatively restricted passage permitting a retarded flow of the liquid in one direction for causing a gradual application of the load and a check-valve-controlled passage permitting a relatively free flow of the liquid in the opposite direction when the load is to be removed.

14. In a machine of the character described, a frame having a work support adapted to receive a specimen thereon, a spindle movable relative to said work support, a penetrator carried by said spindle and engageable with the specimen, a hollow actuating member pivoted on said frame and having operative connection with said spindle for applying a load thereto, and a body of liquid shiftable in said hollow member for increasing the load being applied to the spindle.

15. In a machine of the character described, a frame having a work support adapted to receive a specimen thereon, a spindle movable relative to said work support, a penetrator carried by said spindle and engageable with the specimen, a hollow actuating member pivoted on said frame and having operative connection with said spindle for applying a load thereto, said hollow member having a body of liquid therein which is shiftable in response to swinging of said member in a direction to apply said load, and means for retarding such shifting of said body of liquid for causing a gradual application of the load.

16. In a machine of the character described, a frame having a work support adapted to receive a specimen thereon, a spindle movable relative to said work support, a penetrator carried by said spindle and engageable with the specimen, a hollow actuating member pivoted on said frame and having operative connection with said spindle for applying a load thereto, said hollow member having a body of liquid therein which is shiftable in response to swinging of said member in a direction to apply said load, means for retarding such shifting of said body of liquid for causing a gradual application of the load, and check valve means permitting a relatively rapid return of the liquid during swinging of said member in the opposite direction.

17. In a machine of the character described, a frame having a work support adapted to receive thereon a metal specimen having a dielectric surface, a spindle movable relative to said work support, a penetrator carried by said spindle and engageable with said dielectric surface of the specimen, a hollow actuating member pivoted on said frame and having operative connection with said spindle for applying a load thereto, said hollow member having a body of liquid therein which is shiftable in response to swinging of said member in a direction to apply said load, a gauge having a movable indicator, means for causing actuation of said gauge during movement of the penetrator into the dielectric surface of the specimen, electromagnetic means for stopping the actuation of said gauge and including a circuit adapted to be completed through said specimen and penetrator, and means for retarding the shifting of said liquid in said hollow member for causing a gradual application of the load.

18. In a machine of the character described, a frame having a work support adapted to receive thereon a metal specimen having a dielectric surface, a spindle movable relative to said work support, a penetrator carried by said spindle, said work support being movable on said frame for initially engaging said dielectric surface with said penetrator, a pair of switch contacts adapted to be closed substantially upon the occurrence of such initial engagement of said dielectric surface and penetrator, a hollow actuating member pivoted on said frame and having operative connection with said spindle for applying a load thereto, said hollow member having a body of liquid therein which is shiftable in response to swinging of said member in a direction to apply said load, a gauge having a movable indicator, means including an electromagnet for operatively connecting said gauge with said spindle so as to be responsive to movement of said penetrator into said dielectric surface, an energizing circuit for said electromagnet having said switch contacts therein, means for retarding the shifting of said liquid in said member for causing a gradual application of said load, a second electromagnet for stopping the actuation of said gauge, and energizing means for the second electromagnet including a circuit adapted to be completed through said penetrator and specimen.

JOSEPH GOGAN.

REFERENCES CITED

The following references are of record in the file of this patent:

UNITED STATES PATENTS

| Number | Name | Date |
| --- | --- | --- |
| 264,975 | Van Norden | Sept. 26, 1882 |
| 1,961,764 | Horstkotte | June 5, 1934 |
| 1,978,302 | Gogan | Oct. 23, 1934 |